Patented Aug. 2, 1938

2,125,448

UNITED STATES PATENT OFFICE 2,125,448

FUEL

Joseph W. Johnson, Salem, Hugo Van Roosen, Newton Center, Alexis E. Ushakoff, Beverly, and John J. Brophy, Salem, Mass.

No Drawing. Application December 21, 1935, Serial No. 55,562

1 Claim. (Cl. 44—9)

This invention relates to fuels, and with regard to certain more specific features, to liquid fuels particularly adapted for use in internal combustion engines.

Among the several objects of the invention may be noted the provision of a fuel of the character described which when used in internal combustion engines improves the efficiency of the same by reducing detonation, or knocking, through its retarded rate of expansion and its ability to absorb, in itself, excessive heat of combustion; a fuel which is compounded of a number of ingredients but wherein the ingredients are held in a stable, homogeneous mixture not likely to separate into its component ingredients even on long standing; a fuel which is water-clear, and which contains no foreign substances harmful to the engines wherein it is used; a fuel in which all of the component ingredients are cheap and readily available; and the provision of a method of compounding a fuel of the class described whereby the several ingredients may be assembled into the final fuel with minimum trouble and without necessitating the use of unusual apparatus. Other objects will be in part obvious and in part pointed out hereinafter.

The invention accordingly comprises the elements and combinations of elements, and features of composition which will be exemplified in the products hereinafter described, and the scope of the application of which will be indicated in the following claim.

It is a well established fact that internal combustion engines, such as the ordinary automobile engine, run smoother and with apparently greater efficiency in damp or foggy weather. Although the cause for this is not well understood, it is apparent that the moisture taken into the combustion chamber along with the air for combustion acts in some way as an anti-knocking or anti-detonating agent, possibly due to its high latent heat of vaporization which serves to spread out the peak in the surge in pressure resulting after the explosion.

Numerous attempts have been made to simulate the above conditions by the injection of measured quantities of water into the combustion chamber along with the fuel. These attempts have generally not been satisfactory, on account of the difficulty of metering accurate quantities of water, and of the necessary complexity of the apparatus.

The present invention overcomes these difficulties by providing the water in the fuel. In other words, the liqu'd fuel for the engine (usually of a hydrocarbon nature, such as gasoline, naphtha, kerosene, and the like) is modified by the addition of a predetermined proportionate quantity of water. The water is thus automatically provided in the combustion chamber of the engine in quantities automatically proportioned to the quantity of fuel, and in a vaporized state (obtained by the carbureting action) in which it can operate most effectively as an anti-knocking agent.

It is not a simple matter to provide a stable water-hydrocarbon mixture. The lack of mutual solubility of the two liquids, or even mutual miscibility (beyond a degree which is so slight as to be of no utility for the desired purpose), makes it impossible to simply mix the two liquids and rest content. Obviously, if the mixture is to be a satisfactory fuel, it must be stable and not likely to separate into its components even over long periods of time and under widely varying temperatures and pressures. One of the principal objects of the present invention is to effect, as a useful fuel, such a mixture of a liquid hydrocarbonaceous fuel and water that is stable to the required extent.

It has been found, by experiment, that approximately five to fifteen per cent. of water admixed with gasoline makes a fuel which has all of the required characteristics. The percentage varies somewhat with the type of engine in which the fuel is to be consumed. Ten per cent. water, for example, has been found to be an optimum content for the engine of a 1935 model Ford automobile.

It has also been found, by experiment, that five to fifteen per cent. or even more of water, may be held in a stable mixture with ordinary trade gasoline by using a small portion of a suitable soap as an emulsifying agent. Soaps, it will be understood, are compounded of alkaline material and a fatty acid. Of the alkaline materials investigated, the organic alkalies have been found most satisfactory. Specifically, triethanolamine is found to be of particularly suitable character. Oleic acid has been found suitable as a fatty acid, although other fatty acids, including palmitic, stearic, and butyric acids also appear to be useful.

For example, an emulsion may be made up by thoroughly mixing the following ingredients, in the stated proportions:

| | cc. |
|---|---|
| Triethanolamine | 18 |
| Oleic acid | 58 |
| Water | 75 |
| Gasoline (aviation grade B) | 750 |

This final emulsion has a water content of about ten per cent.

The emulsion as thus prepared is stable over long periods of time, showing no tendency whatsoever to separate into its constituents, and temperature variations over the normal range of outdoor temperatures likewise show no tendency to cause the emulsion to break, or separate out. This emulsion can be used directly as a fuel in an automobile, with all of the advantages hereinbefore stated.

While the emulsion disclosed is satisfactory as a fuel directly, and without further modification, its milky white character, it is believed, might make it difficult to sell as compared with clear gasoline, in view of the established tendency of consumers to regard the clarity of a gasoline as a prime factor of its purity. The addition of a small quantity, such as one per cent., of higher acyclic alcohols, such as the normal, secondary and tertiary alcohols of the propyl, amyl, butyl, hexyl and octyl series, reduces the viscosity without reversing the phase of the emulsion, and thereby increases the fluidity of the fluid. At the same time, the character of the emulsion is changed so that it becomes a clear solution which is not readily distinguishable from regular gasoline. The addition of the higher alcohol does not affect the stability of the mixture; in fact, the clarification seems even to somewhat improve the stability of the product.

For example, if to the emulsion described above, there be added in addition the following ingredients, in the stated proportions:

|  | cc. |
|---|---|
| Butyl cellosolve | 20 |
| (ethylene glycol monobutyl ether) |  |
| Secondary hexyl alcohol | 25 | the emulsion becomes water-clear, with suitable stirring, and no tendency is manifested for the water and gasoline to separate.

The clear product thus produced constitutes the preferred product of the present invention. The emulsifying and clarifying agents, it will be noted, are all added in such relatively small proportions and are such relatively inexpensive substances, that the product may be produced at little or no cost over the prevailing price of regular gasoline, considered on the basis of equal volumes. These agents, it is further to be noted, are themselves not deleterious components of the fuel, so far as corrosive action on the cylinder walls, carburetors, fuel lines, tanks, and the like are concerned. In fact, the added agents may themselves aid in knock suppression.

Although, as has been stated, the precise reason for the advantageous results obtained through the use of the fuel of the present invention is not fully known, it appears that the presence of water vapor, obtained directly from the fuel, in the combustion chamber at the time of the explosion therein, prevents knocking by (1) retarding the rate of expansion, and (2) absorbing excessive heat of combustion. Both of these phenomena are apparently attributable to the high latent heat of vaporization of the water. The presence of the water in the combustion chamber also appears to inhibit the formation of carbon on the chamber walls, or tends to remove the carbon from the chamber walls if it is formed.

Regardless of the reasons for the benefits obtained, however, it is demonstrable that the use of fuel as herein provided results in a considerably higher efficiency in the operating cycle of the internal combustion engine, and a freedom from knocking, etc.

In view of the above, it will be seen that the several objects of the invention are achieved and other advantageous results attained.

As many changes could be made in carrying out the above compositions without departing from the scope of the invention, it is intended that all matter contained in the above description shall be interpreted as illustrative and not in a limiting sense.

We claim:

A substantially clear liquid fuel of stable character obtained by mixing the following substances in substantially the stated proportions:

|  | cc. |
|---|---|
| Triethanolamine | 18 |
| Oleic acid | 58 |
| Butyl cellosolve | 20 |
| Secondary hexyl alcohol | 25 |
| Water | 75 |
| Gasoline | 750 |

JOSEPH W. JOHNSON.
HUGO VAN ROOSEN.
ALEXIS E. USHAKOFF.
JOHN J. BROPHY.